(12) United States Patent
Wang (10) Patent No.: US 9,618,684 B2
(45) Date of Patent: Apr. 11, 2017

(54) BACKLIGHT MODULE AND DISPLAY DEVICE

(71) Applicant: BOE TECHNOLOGY GROUP CO., LTD., Beijing (CN)

(72) Inventor: Shang Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 263 days.

(21) Appl. No.: 14/389,653

(22) PCT Filed: Dec. 12, 2013

(86) PCT No.: PCT/CN2013/089215
§ 371 (c)(1),
(2) Date: Sep. 30, 2014

(87) PCT Pub. No.: WO2015/010418
PCT Pub. Date: Jan. 29, 2015

(65) Prior Publication Data
US 2016/0259117 A1    Sep. 8, 2016

(30) Foreign Application Priority Data

Jul. 26, 2013 (CN) .......................... 2013 1 0319932

(51) Int. Cl.
*F21V 9/14* (2006.01)
*F21V 7/04* (2006.01)
(Continued)

(52) U.S. Cl.
CPC ............. *G02B 6/0056* (2013.01); *G02B 6/00* (2013.01); *G02B 6/005* (2013.01); *G02B 6/0053* (2013.01);
(Continued)

(58) Field of Classification Search
CPC .... G02B 6/003; G02B 6/0013; G02B 6/0056; G02B 27/283; G02F 1/13362
See application file for complete search history.

(56) References Cited

U.S. PATENT DOCUMENTS 6,352,350 B1    3/2002   Ma
7,379,130 B1 *  5/2008   Bhalla .................. G02B 6/0056
                                                   349/61
(Continued)

FOREIGN PATENT DOCUMENTS

CN    2586979 Y    11/2003
CN    1621909 A     6/2005
(Continued)

OTHER PUBLICATIONS

English translation of Written Opinion of the International Searching Authority for international application No. PCT/CN2013/089215.
(Continued)

*Primary Examiner* — Karabi Guharay
(74) *Attorney, Agent, or Firm* — Harness, Dickey & Pierce, P.L.C.

(57) ABSTRACT

The present disclosure provides a backlight module and a display device. The backlight module includes a light source and a light guide plate. The backlight module further includes: a light collimation element configured to convert divergent rays emitted from the light source into parallel rays; a polarizing beam-splitting element configured to convert the parallel rays into a first polarized ray and a second polarized ray with their vibration directions perpendicular to each other; and a phase delaying element configured to convert the vibration direction of the second polarized ray to be identical to that of the first polarized ray, so as to form a third polarized ray. The first and third polarized (Continued)

rays form incident polarized rays entering into the light guide plate. The light guide plate is configured to receive the incident polarized rays.

14 Claims, 5 Drawing Sheets

(51) Int. Cl.
  *F21V 8/00* (2006.01)
  *G02F 1/1335* (2006.01)
  *G02B 6/00* (2006.01)
  *G02B 27/28* (2006.01)

(52) U.S. Cl.
  CPC ......... *G02B 6/0055* (2013.01); *G02B 6/0096* (2013.01); *G02B 27/283* (2013.01); *G02F 1/13362* (2013.01); *G02F 1/133615* (2013.01)

(56) References Cited

U.S. PATENT DOCUMENTS

2007/0081319 A1* 4/2007 Fang .................... G02B 6/0023
  362/19
2012/0201045 A1* 8/2012 Gotou .................. G02B 6/0061
  362/602

FOREIGN PATENT DOCUMENTS

| | | |
|---|---|---|
| CN | 1721950 A | 1/2006 |
| CN | 1881023 A | 12/2006 |
| CN | 1952754 A | 4/2007 |
| CN | 102095142 A | 6/2011 |
| CN | 102454915 A | 5/2012 |
| CN | 102809105 A | 12/2012 |
| CN | 202747156 U | 2/2013 |
| CN | 103411160 A | 11/2013 |
| JP | H0973083 A | 3/1997 |
| JP | 5170221 B2 | 3/2013 |
| KR | 100738111 B1 | 7/2007 |
| TW | I294546 B | 3/2008 |

OTHER PUBLICATIONS

International Search Report and Written Opinion dated Dec. 12, 2013 regarding PCT/CN2013/089215.

Chinese Office Action dated Feb. 16, 2015 regarding Chinese Application No. 201310319932.8. Translation provided by Dragon Intellectual Property Law Firm.

* cited by examiner

BACKLIGHT MODULE AND DISPLAY DEVICE

CROSS-REFERENCE TO RELATED APPLICATION

This application is the U.S. national phase of PCT Application No. PCT/CN2013/089215 filed on Dec. 12, 2013, which claims priority to Chinese Patent Application No. 201310319932.8 filed on Jul. 26, 2013, the disclosures of which are incorporated in their entirety by reference herein.

FIELD OF THE INVENTION

The present disclosure relates to the field of display technology, in particular to a backlight module and a display device.

DESCRIPTION OF THE PRIOR ART

Along with the rapid development of the display technology, a liquid crystal display (LCD), as one of the display devices, has become a mainstream in the field of flat panel display. The LCD uses an electric field formed by two pieces of conductive glasses to drive liquid crystals between the two pieces of conductive glasses, thereby achieving the display. Since the liquid crystals themselves cannot emit light, thus, the LCD requires an external light source to achieve transmissive or reflective displays. Most of the existing LCDs are of a transmissive type, and for these LCDs, backlight modules are indispensable components.

A backlight module of an existing LCD usually provides natural light without any specific vibration direction. When the backlight module is applied in the LCD, it is required to provide two polarizers at upper and lower sides of a liquid crystal cell, respectively, so as to convert the natural light emitted from the backlight module and entering the polarizers into polarized light, and to allow the polarized light in a certain vibration direction to pass therethrough. Thus, the LCD merely makes use of one part of the light provided by the existing backlight module, i.e., for the natural light provided by the backlight module, merely linearly polarized light in one direction is used by the LCD for displaying an image, while linearly polarized light in other directions is blocked. As a result, a light loss occurs.

SUMMARY OF THE INVENTION

Based on the above, an object of technical solutions of the present disclosure is to provide a backlight module and a display device, and the backlight module can generate linearly polarized light so as to fully convert natural light emitted from a light source into the linearly polarized light capable of passing through a liquid crystal cell, thereby making full use of the natural light emitting from the light source.

In one aspect, the present disclosure provides a backlight module including a light source and a light guide plate. The backlight module further includes: a light collimation element configured to convert divergent rays emitted from the light source into parallel rays; a polarizing beam-splitting element configured to convert the parallel rays into a first polarized ray and a second polarized ray with their vibration directions perpendicular to each other; and a phase delaying element configured to convert the vibration direction of the second polarized ray to be identical to that of the first polarized ray so as to form a third polarized ray. The first and third polarized rays form incident polarized ray entering into the light guide plate, and the light guide plate is configured to receive the incident polarized ray.

In an optionally embodiment of the present disclosure, the backlight module further includes a first reflecting element. The polarizing beam-splitting element, the phase delaying element and the first reflecting element are arranged sequentially along a transmission direction of the parallel rays. After the parallel rays pass through the polarizing beam-splitting element, the first polarized ray is reflected by the polarizing beam-splitting element to a light-entering surface of the light guide plate; the second polarized ray passes through the polarizing beam-splitting element and continues to travel to the phase delaying element. The second polarized ray is converted into the third polarized ray via the phase delaying element, and the third polarized ray is reflected by the first reflecting element to the light-entering surface of the light guide plate.

In an optionally embodiment of the present disclosure, the backlight module further includes a light guide tube, which includes a hollow tube body arranged parallel to the transmission direction of the parallel rays and which is configured to receive the parallel rays, so as to transmit the parallel rays within the hollow tube body. The polarizing beam-splitting element and the phase delaying element are arranged within the hollow tube body.

In an optionally embodiment of the present disclosure, the backlight module further includes a first light blocking element, which is coupled to the polarizing beam-splitting element and arranged along a direction parallel to the transmission direction of the parallel rays, so as to prevent rays from being directly transmitted to the phase delaying element without passing through the polarizing beam-splitting element, or prevent the rays from being transmitted outside the light guide tube.

In an optionally embodiment of the present disclosure, the first light blocking element is a second reflecting element having a light reflecting function.

In an optionally embodiment of the present disclosure, the polarizing beam-splitting element is obliquely arranged backward in the transmission direction of the parallel rays.

In an optionally embodiment of the present disclosure, the backlight module is provided with at least two polarizing beam-splitting elements and at least two first light blocking elements, which are spaced apart from each other and arranged in a stair-like manner within the light guide tube from a position away from a light-exiting surface of the light guide tube to a position close to the light-exiting surface of the light guide tube. A projection of the polarizing beam-splitting elements and the first light blocking elements on a transverse section of the hollow tube body covers the entire transverse section.

In an optionally embodiment of the present disclosure, the backlight module further includes a second light blocking element arranged behind the phase delaying element within the hollow tube body along a direction parallel to the transmission direction of the parallel rays and coupled to the first reflecting element; the second light blocking element being configured, so as to block the rays from being transmitted outside the hollow tube body.

In an optionally embodiment of the present disclosure, the backlight module is provided with at least two second light blocking elements and at least two first reflecting elements, which are spaced apart from each other and arranged in a stair-like manner within the light guide tube from a position away from the light-exiting surface of the light guide tube to a position close to the light-exiting surface of the light guide tube. A projection of the second light blocking elements and the first light blocking elements on the transverse section of the hollow tube body covers the entire transverse section.

In an optionally embodiment of the present disclosure, the light guide plate of the light guide module includes a light-exiting surface of the light guide plate and a first surface arranged parallel and opposite to the light-exiting surface of the light guide plate.

The light guide plate further includes: a reverse prism layer arranged on the light-exiting surface of the light guide plate and configured to transmit the incident polarized rays, after passing through the light guide plate, in a direction perpendicular to the light-exiting surface of the light guide plate; and a reflective prism layer arranged on the first surface of the light guide plate and configured to reflect the incident polarized ray transmitted within the light guide plate and reaching the first surface toward the light-exiting surface of the light guide plate.

In an optionally embodiment of the present disclosure, the light guide plate of the backlight module further includes a third reflecting element arranged on an outer surface of the first surface and configured to reflect the incident polarized ray passing through the first surface to an interior of the light guide plate.

In an optionally embodiment of the present disclosure, the backlight guide further includes a beam expanding element arranged at a light-entering side of the light guide plate and configured to increase an incident angle of the incident polarized ray entering the light guide plate.

In an optionally embodiment of the present disclosure, the polarizing beam-splitting element includes a dual brightness enhancement film.

In an optionally embodiment of the present disclosure, the phase delaying element includes a half-wave plate or two quarter-wave plates.

In another aspect, the present disclosure provides a display device including a display panel and the above-mentioned backlight module.

At least one of the above technical solutions of the present disclosure has the following advantageous effect.

Adopting the backlight module of one embodiment of the present disclosure, the natural light emitted from the light source passes sequentially through the light collimation element, the polarizing beam-splitting element and the phase delaying element, so that the natural light emitted from the light source may be fully converted into the polarized light consistent with a transmission axis of the polarizer on the display panel. Thus, the natural light emitted from the light source may be fully utilized, and the problem that a part of the natural light emitted from the existing backlight module is lost and cannot be utilized fully can be overcome, thereby greatly improving the light energy utilization ratio of the entire display device.

DETAILED DESCRIPTION OF THE PREFERRED EMBODIMENTS

Structures and principles of the present disclosure will be described hereinafter in conjunction with the drawings. The following embodiments are merely for illustrative purposes, but are not used to limit the protection scope of the present disclosure.

First Embodiment

Figure 1:
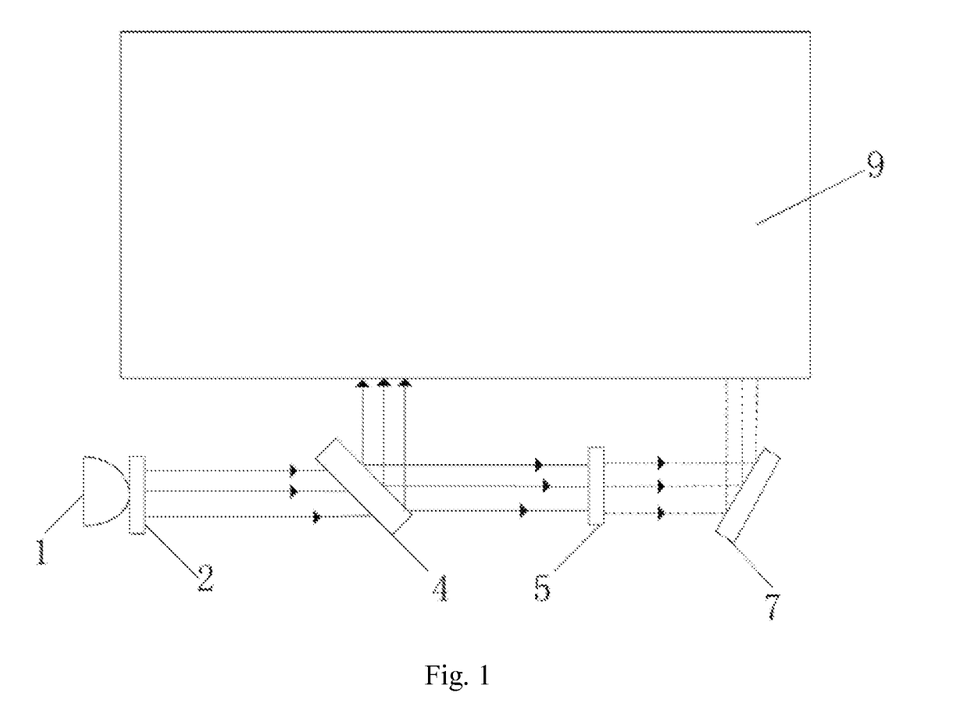
FIG. 1 is a plan view showing a structure of a backlight module according to a first embodiment of the present disclosure.

As shown in FIG. 1, a backlight module according to the first embodiment includes a light source 1 and a light guide plate 9. The backlight module further includes:

a light collimation element 2 configured to convert divergent rays emitted from the light source 1 into parallel rays;

a polarizing beam-splitting element 4 configured to convert the parallel rays into a first polarized ray and a second polarized ray with their vibration directions perpendicular to each other; and a phase delaying element 5 configured to convert the vibration direction of the second polarized ray to be identical to that of the first polarized ray, to form a third polarized ray.

The first and third polarized rays form incident polarized rays entering into the light guide plate. The light guide plate is configured to receive the incident polarized rays.

Through the backlight module of the first embodiment, natural light emitted from the light source passes sequentially through the light collimation element, the polarizing beam-splitting element and the phase delaying element, so that the natural light emitted from the light source is fully converted into the polarized rays consistent with a transmission axis of a polarizer on a display panel. Thus, it is able to make full use of the natural light emitted from the light source and remarkably improve the light energy utilization ratio of the entire display device.

Optionally, the backlight module according to the first embodiment further includes a first reflecting element 7 configured to reflect the third polarized ray obtained via converting the vibration direction by the phase delaying element 5 toward the light guide plate 9, so as to enable the third polarized ray to enter the light guide plate 9.

Second Embodiment

Figure 2:
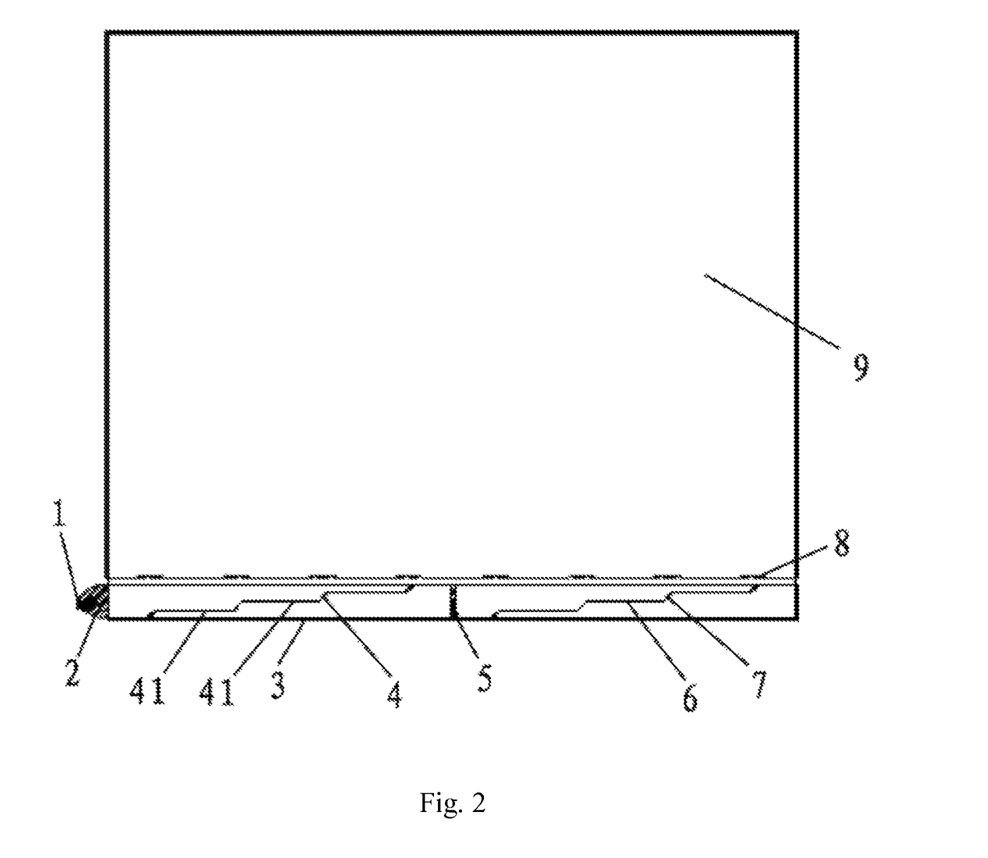
FIG. 2 is a plan view showing a structure of a backlight module according to a second embodiment and a third embodiment of the present disclosure.
Figure 3:
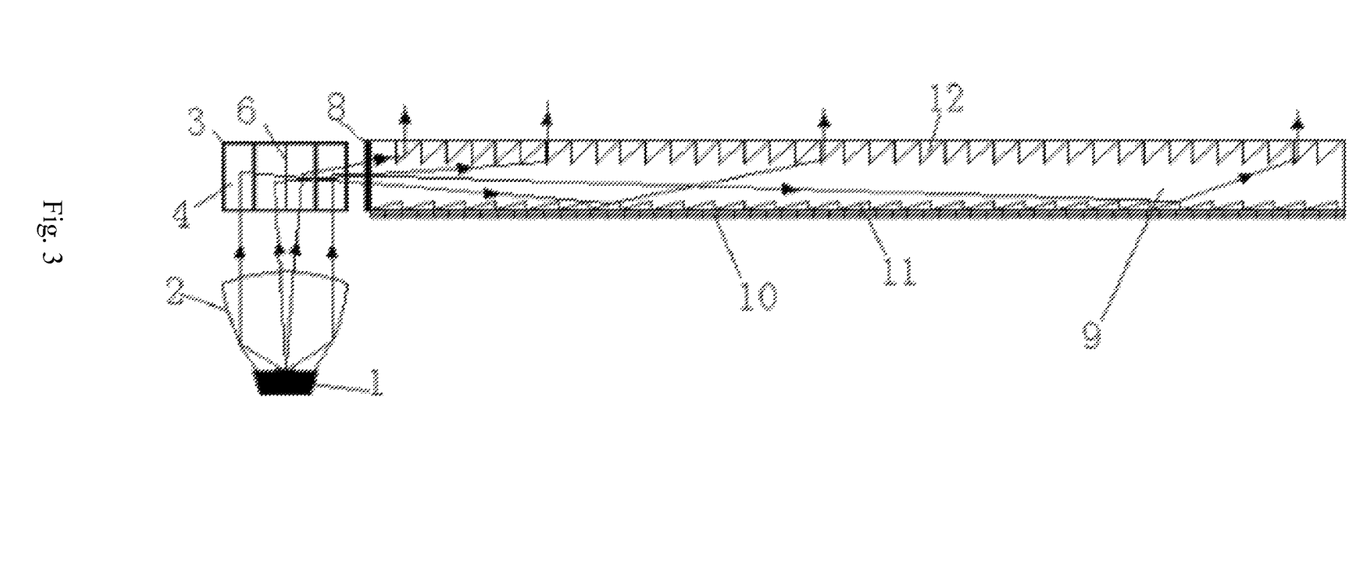
FIG. 3 is a sectional view of the backlight module in FIG. 2.

As shown in FIG. 2 and FIG. 3, the second embodiment differs from the first embodiment in that a light guide tube 3 is added. The light guide tube 3 includes a hollow tube body which is parallel to a transmission direction of the parallel rays and configured to receive the parallel rays, so as to transmit the parallel rays within the hollow tube body. The light collimation element 2, the polarizing beam-splitting element 4, the phase delaying element 5 and the first reflecting element 7 are arranged within the hollow tube body of the light guide tube. The backlight module of the present disclosure further uses the light guide tube to restrain the rays, so as to avoid that the rays emitted from the light source cannot be fully utilized due to outdiffusion of the rays emitted from the light source.

Optionally, in the backlight module of the second embodiment of the present disclosure, the light guide plate 9 includes:

a reverse prism layer 12 arranged on a light-exiting surface of the light guide plate 9 and configured to transmit the incident polarized ray, after passing through the light guide plate 9, in a direction perpendicular to the light-exiting surface of the light guide plate; and a reflective prism layer 11 arranged on a first surface of the light guide plate 9 and configured to reflect the incident polarized ray, which is transmitted within the light guide plate 9 and reaches the first surface, toward the light-exiting surface of the light guide plate. The first surface is parallel to the light-exiting surface of the light guide plate, and the first surface and the light-exiting surface of the light guide plate are both surfaces perpendicular to a light-entering surface of the light guide plate 9.

Through the reverse prism layer 12 arranged on the light-exiting surface of the light guide plate and the reflective prism layer 11 arranged on the first surface of the light guide plate, the incident polarized ray entering the light guide plate 9 may maintain its polarization state in a better manner and may exit from the light guide plate in a direction perpendicular to the light-exiting surface of the light guide plate.

Third Embodiment

In the backlight module of this embodiment, the polarizing beam-splitting element 4 may be formed by any commercially-available film capable of achieving a polarizing beam-splitting function. Optionally, the polarizing beam-splitting element 4 includes a dual-brightness enhancement film (DBEF).

Optionally, the phase delaying element 5 includes a half-wave plate.

Structures of respective components of the backlight module according to the third embodiment of the present disclosure will be described hereinafter in conjunction with FIGS. 2-4.

Referring to FIG. 2, the backlight module according to the third embodiment of the present disclosure includes the light source 1, the light collimation element 2, the light guide tube 3, the light guide plate 9, as well as the polarizing beam-splitting element 4 and the phase delaying element 5 arranged within the light guide tube 3.

In this embodiment, the light source 1 may include, but not limited to, at least one light-emitting diode (LED) lamp, as long as it can emit natural white light. The light guide tube 3 is arranged parallel to a side surface of the light guide plate 9, and this side surface is the light-entering surface of the light guide plate 9. The light collimation element 2 is arranged between the light source 1 and the light guide tube 3. Through the light collimation element 2, the rays emitted from the light source 1 are collimated so as to convert emitted divergent rays into parallel rays. Optionally, the light collimation element 2 is a collimating lens, optionally a total internal reflection (TIR) collimating lens which may collimate the rays by total internal reflection and refraction and thus may obtain an excellent collimating effect. A person skilled in the art should know structures and principles of a collimating lens capable of converting divergent rays into parallel rays, which thus will not be repeated herein.

After passing through the light collimation element 2, the rays emitted from the light source 1 form the parallel rays with substantially the same transmission direction. The parallel rays enter the light guide tube 3. The light guide tube 3 is arranged parallel to the transmission direction of the parallel rays, and includes the hollow tube body parallel to the transmission direction of the parallel rays, so that the parallel rays emitted from the light collimation element 2 may be transmitted along the hollow tube body, thereby further restraining the rays and avoiding that the rays cannot be fully utilized due to the outdiffusion thereof. The polarizing beam-splitting element 4 and the phase delaying element 5 are arranged sequentially along the transmission direction of the parallel rays. The parallel rays entering the light guide tube 3 are converted into the first polarized ray and the second polarized ray with their vibration directions perpendicular to each other by the polarizing beam-splitting element 4. The vibration direction of the second polarized ray is converted to be identical to that of the first polarized ray by the phase delaying element 5 so as to form the third polarized ray.

The polarizing beam-splitting element 4 optionally includes a DBEF capable of converting the natural light into two linearly polarized rays with their vibration directions perpendicular to each other. The DBEF is usually composed of multiple layers of prism films through which the linearly polarized ray vibrated in a second direction may pass and by which the linearly polarized ray vibrated in a first direction (perpendicular to the second direction) is reflected, so that the rays may be converted into the first polarized ray and the second polarized ray with their vibration directions perpendicular to each other. The natural light passes through the light collimation element 2 and then enters the light guide tube 3, and then is transmitted forward in the light guide tube 3 in a direction parallel to the light guide tube 3. When reaching the polarizing beam-splitting element 4, the polarized ray (the second polarized ray) with its vibration direction parallel to a transmission axis of the DBEF passes through the polarizing beam-splitting element 4 and continues to travel; while the polarized ray (the first polarized ray) with its vibration direction perpendicular to the transmission axis of the DBEF is reflected by the prism film of the DBEF toward the light-entering surface of the light guide plate 9.

Figure 4:
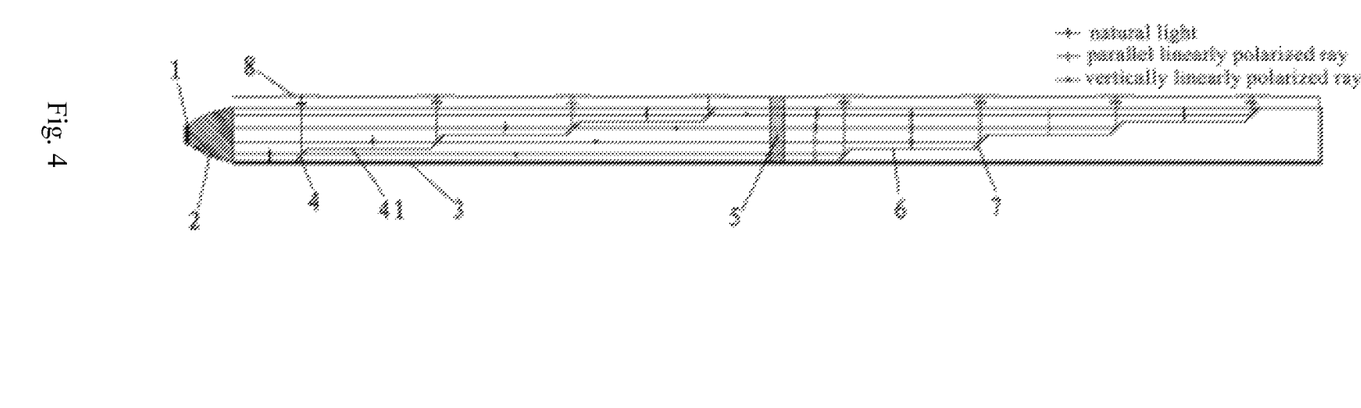
FIG. 4 is a sectional view showing a conversion procedure of light polarization state in a light guide tube of the backlight module in FIG. 2.

FIG. 4 is a sectional view showing a conversion procedure of light polarization state in the light guide tube of the backlight module in FIG. 2. Specifically, taking the polarized ray transmitted in a direction parallel to the light guide tube 3 having a vibration direction perpendicular to the transmission axis of the DBEF while the polarized ray transmitted in a direction perpendicular to the light guide tube 3 having a vibration direction parallel to the transmission axis of the DBEF as an example, the parallel linearly polarized ray parallel to the light guide tube 3 is reflected by the polarizing beam-splitting element 4, while the vertical linearly polarized ray perpendicular to the light guide tube 3 passes through the polarizing beam-splitting element 4 and continues to travel. The transmission directions of the rays perpendicular to the transmission axis of the DBEF and parallel to the transmission axis of the DBEF are merely for illustrative purposes, and are not limited thereto. For example, the polarized ray perpendicular to the transmission axis of the DBEF may also be perpendicular to the light guide tube 3, while the polarized ray parallel to the transmission axis of the DBEF may also be parallel to the light guide tube 3.

A person skilled in the art should know principles and structures of the DBEF capable of converting the natural light into linearly polarized rays with their vibration directions perpendicular to each other, which will not be repeated herein.

In the third embodiment of the present disclosure, as shown in FIG. 2, the rays passing through the light collimation element 2 include substantially parallel rays, and also possibly include very few non-parallel rays with slight deviation. Thus, in order to prevent the few non-parallel rays in the light guide tube 3 from not being fully converted by the polarizing beam-splitting element 4 due to the diffusion thereof, i.e., to prevent the few non-parallel rays from being transmitted to the phase delaying element 5 or being diffused outside the light guide tube 3, a first light blocking element 41 coupled to the polarizing beam-splitting element 4 is arranged within the light guide tube 3 in a direction parallel to the transmission direction of the parallel rays. The first light blocking element 41 is optionally a second reflecting element having a reflecting function, so as to reflect the few non-parallel rays toward the polarizing beam-splitting element 4, thereby improving the utilization ratio of the rays. The first light blocking element 41 may also function as blocking the light only, i.e., preventing the rays from being directly transmitted to the phase delaying element 5 or preventing the rays from being diffused outside the light guide tube 3. Optionally, the polarizing beam-splitting element 4 is obliquely backward arranged in the transmission direction of the parallel rays (as shown in FIGS. 2 and 4).

Further, optionally, at least two polarizing beam-splitting elements 4 and at least two first light blocking elements 41 (four polarizing beam-splitting elements 4 and three first light blocking elements 41 in FIG. 2) are spaced apart from each other and arranged in a stair-like manner within the light guide tube 3, as shown in FIGS. 2 and 4, from a position away from the light-exiting surface of the light guide tube 3 to a position close to the light-exiting surface of the light guide tube 3. Thus, a projection of the polarizing beam-splitting elements 4 and the first light blocking elements 41 on a transverse section of the hollow tube body cover the entire transverse section, so that all the rays entering the light guide tube 3 may be utilized as much as possible.

Figure 5:
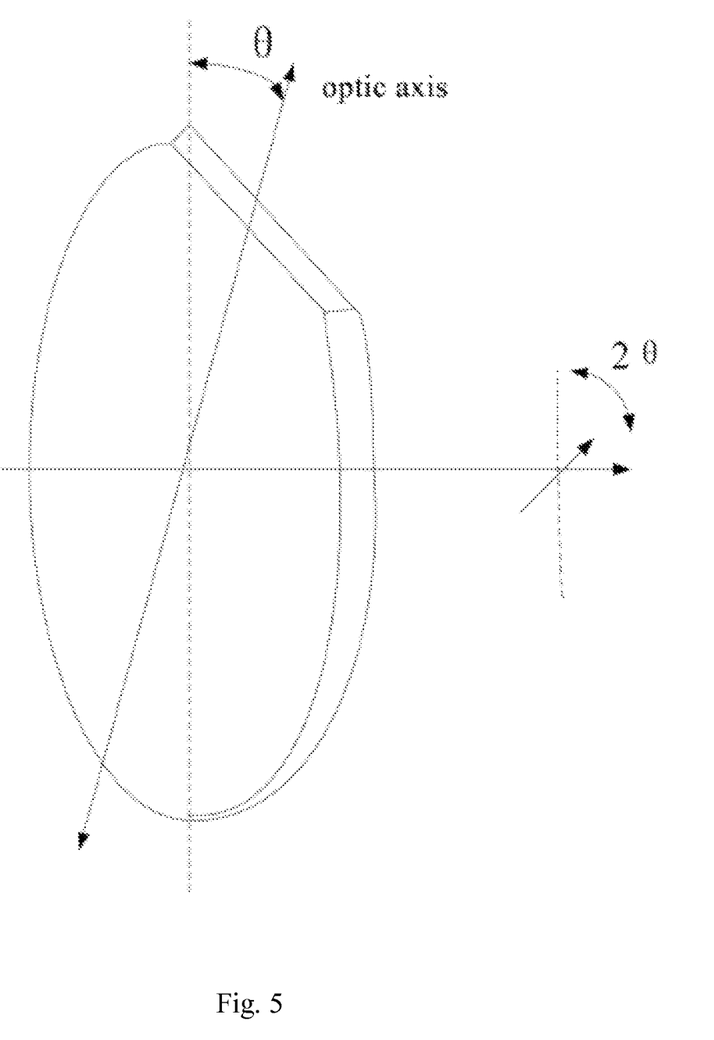
FIG. 5 is a schematic view showing a working principle of a phase delaying element adopted in one embodiment of the present disclosure.

In the third embodiment of the present disclosure, the phase delaying element 5 includes a half-wave plate or two quarter-wave plates. Phase offset is generated through two orthogonal polarized components of the plates, so as to adjust a polarization state of beams. Taking the half-wave plate as an example, after the linearly polarized ray passes through the half-wave plate, it is still a linearly polarized ray, but a vibration plane of its coupled vibrations is rotated by an angle of 2θ relative to a vibration plate of the incident polarized ray, as shown in FIG. 5. If θ=45°, a vibration plane of an emergent ray is perpendicular to a vibration plane of an original incident ray. In other words, when θ=45°, the polarization state of the ray may be rotated by 90° through the half-wave plate.

Thus, when the phase delaying element 5 is a half-wave plate, an optic axis of the half-wave plate is parallel to the DBEF, so that amplitudes of the parallel rays transmitted within the light guide tube 3 vary in two directions perpendicular to each other, which results in phase delay. As a result, there is an angle of 90° between the vibration direction of the incident polarized ray entering the half-wave plate and the vibration direction of the emergent polarized ray exiting from the half-wave plate. In this embodiment of the present disclosure, through the half-wave plate of the phase delaying element 5, a polarized ray (the second polarized ray) having a vibration direction parallel to the transmission axis of the DBEF is converted into a polarized ray (the third polarized ray) having a vibration direction perpendicular to the transmission axis of the DBEF. Taking a ray transmission mode shown in FIG. 4 as an example, the half-wave plate of the phase delaying element 5 converts a polarized ray transmitted in a direction perpendicular to the light guide tube into a polarized ray transmitted in a direction parallel to the light guide tube.

When the phase delaying element 5 is composed of two quarter-wave plates, the working principle thereof is the same as that of the half-wave plate, which will not be repeated herein.

Referring to FIG. 2, the backlight module according to one embodiment of the present disclosure further includes a second light blocking element 6 and the first reflecting element 7.

The second light blocking element 6 is arranged within the hollow tube body of the light guide tube 3 and arranged behind the phase delaying element 5 in a direction parallel to the transmission direction of the parallel rays. The second light blocking element 6 is coupled to the first reflecting element 7 and configured to block the incident polarized ray which is formed after being converted by the phase delaying element 5 from transmitting outside the hollow tube body. Optionally, the second light blocking element 6 is an element having a reflecting function, so as to reflect rays reaching the second light blocking element 6 toward the light-exiting surface of the light guide tube 3 (i.e., the light-entering surface of the light guide plate 9) or the first reflecting element 7.

The first reflecting element 7 is coupled to the second light blocking element 6 and configured to reflect the incident polarized ray toward the light-entering surface of the light guide plate 9.

Further, optionally, at least two second light blocking elements 6 and at least two first reflecting elements 7 are spaced apart from each other and arranged in a stair-like manner within the light guide tube 3, as shown in FIGS. 2 and 4, from a position away from the light-exiting surface of the light guide tube 3 to a position close to the light-exiting surface of the light guide tube 3. Thus, a projection of the second light blocking elements 6 and the first light reflecting elements 7 on the transverse section of the hollow tube body covers the entire transverse section, so that all the rays entering the light guide tube 3 may be utilized as much as possible.

Through the second light blocking element 6 and the first reflecting element 7, it is able to further ensure that the light emitted from the light source 1 may be fully transmitted to the interior of the light guide plate 9 and thus be fully utilized.

In the backlight module according to one embodiment of the present disclosure, after passing through the first light blocking element 41, the polarizing beam-splitting element 4, the phase delaying element 5, the second light blocking element 6 and the first reflecting element 7 arranged within the light guide tube 3, the natural light emitted from the light source 1 is fully converted into linearly polarized rays with one vibration direction (first linearly polarized ray, which is a polarized ray parallel to the transmission axis of the DBEF in one embodiment of the present disclosure; when the transmission axis of the DBEF is varied by 90°, the first polarized ray and the second polarized ray are also varied by 90°). The linearly polarized rays with one vibration direction enter the light guide plate 9, enter a lower polarizer of a display device after uniformly transmitted in the light guide plate 9, pass through the lower polarizer of the display device and travel to a liquid crystal layer for displaying an image.

Referring to FIGS. 2 and 3, the light guide tube 3 is arranged at a side of the light guide plate 9. Optionally, a beam expanding element 8 is arranged at a light-entering side of the light guide plate 9 where the ray from the light guide tube 3 is received, so as to increase an incident angle of the incident polarized ray entering the light guide plate. The beam expanding element 8 may include a plurality of hemispherical beam-expanding prisms, so as to form an array of hemispherical beam-expanding prisms. The incident angle of the incident rays is increased through the hemispherical beam-expanding prisms, so that the incident polarized ray may uniformly within the light guide plate 9 to make more uniform light on the light guide plate 9. A person skilled in the art should know structures of the beam expanding element 8, which is not a focus of the present disclosure and thus will not be repeated herein.

Further, in order to enable the incident polarized ray entering the light guide plate 9 to maintain its polarization state in a better manner, in the backlight module according to one embodiment of the present disclosure, as shown in FIG. 3, the light guide plate 9 includes:

the reverse prism layer 12 arranged on the light exiting surface of the light guide plate 9 (an upper surface as shown in FIG. 3, which is a surface perpendicular to the light-entering surface of the light guide plate 9) and configured to transmit the incident polarized ray, after passing through the light guide plate 9, in a direction perpendicular to the light-exiting surface of the light guide plate 9;

the reflective prism layer 11 arranged on the first surface of the light guide plate 9 (a lower surface as shown in FIG. 3, which is a surface perpendicular to the light-entering surface of the light guide plate 9 and parallel to the light-exiting surface of the light guide plate 9) and configured to reflect the incident polarized ray transmitted within the light guide plate 9 and reaching the first surface toward the light-exiting surface of the light guide plate, the light-existing surface of the light guide plate being parallel to the first surface; and a third reflecting element 10 arranged on an outer surface of the first surface and configured to reflect the incident polarized ray passing through the first surface to the interior of the light guide plate 9.

Prim structures on the reverse prism layer 12 and the reflective prism layer 11 are arranged along a direction parallel to the light guide tube 3 (substantially perpendicular to the transmission direction of the rays within the light guide plate 9), and this may maintain the polarization state of the rays in a better manner. In addition, the reverse prism layer 12 and the total internal reflection prism layer 11 on the upper and lower surfaces of the light guide plate 9 are used to control directions of the rays within the light guide plate 9, respectively, and the third reflecting element 10 is arranged at a lower portion of the light guide plate. Such a structure may ensure that the rays emitted from the light guide plate 9 are emitted in a direction perpendicular to the first surface and may prevent light leakage.

The reverse prism layer 12 and the reflective prism layer 11 may be formed as a film, respectively, and arranged on the light-exiting surface and the first surface of the light guide plate 9 by adhesion or machining, respectively.

It should be appreciated that, oblique angles and distribution density of the prisms on the reverse prism layer 12 and the reflective prism layer 11 may affect the reflection and transmission of the incident rays on the prisms. In order to uniformly transmit the incident polarized ray in the light guide plate 9 and ensure that the incident polarized ray may emit from the light guide plate 9 in a direction perpendicular to the first surface, a person skilled in the art should know the ways to achieve the above-mentioned effects in accordance with practical experiences, which will thus not be repeated herein.

The light guide plate 9 may also include a light guide plate of other form commonly used in the art.

Fourth Embodiment

In this embodiment, a display device is provided and includes a display panel and a backlight module according to any of the above-mentioned embodiments. The structure of the backlight module may refer to the above description in conjunction with FIGS. 2-4, which will not be repeated herein.

The display device may any product or component which uses the backlight module to achieve the display function, such as a liquid crystal panel, an OLED panel, a mobile phone, a tablet PC, a television, a display, a laptop PC, a digital photo frame, and a navigator.

The backlight module and the display device according to one embodiment of the present disclosure have following advantageous effects.

The natural light emitted from the light source is fully converted into polarized rays with one vibration direction through the light collimation element, the polarizing beam-splitting element and the phase delaying element, so that the natural white light emitted from the light source may be fully utilized and the light energy utilization ratio of the entire display device is greatly improved.

Through the cooperation of the reverse prism layer and the reflective prism layer arranged on the light-exiting surface and the first surface of the light guide plate, the polarized state of the incident polarized ray entering the light guide plate may be maintained in a better manner, and the incident polarized ray entering the light guide plate may emit from the light guide plate in a direction perpendicular to the light-exiting surface of the light guide plate, thereby controlling the directions of the rays transmitted in the light guide plate and ensuring uniformity of light transmission in the light guide plate.

The third reflecting element is used to prevent light leakage, thereby making full use of the rays.

The DBEF is used as the polarizing beam-splitting element and the half-wave plate is used as the phase delaying element, so it is able to simplify the structure and facilitate the implementation thereof.

The above are merely exemplary embodiments of the present disclosure. It should be appreciated that, a person skilled in the art may make further modifications and improvements without departing from the scope of the present disclosure, and these modifications and improvements should also be considered as within the scope of the present disclosure.

What is claimed is:

1. A backlight module, comprising a light source and a light guide plate; the backlight module further comprising:
    a light collimation element configured to convert divergent rays emitted from the light source into parallel rays;
    a polarizing beam-splitting element configured to convert the parallel rays into a first polarized ray and a second polarized ray with their vibration directions perpendicular to each other; and
    a phase delaying element configured to convert the vibration direction of the second polarized ray to be identical to that of the first polarized ray so as to form a third polarized ray; wherein the first polarized ray and the third polarized ray form incident polarized rays entering into the light guide plate; and the light guide plate is configured to receive the incident polarized rays;
    wherein the backlight module further comprises:
    a light guide tube including a hollow tube body which is arranged parallel to the transmission direction of the parallel rays; the light guide tube being configured to receive the parallel rays so as to transmit the parallel rays within the hollow tube body;

wherein the polarizing beam-splitting element and the phase delaying element are arranged within the hollow tube body.

2. The backlight module according to claim 1, further comprising:
a first reflecting element;
wherein the polarizing beam-splitting element, the phase delaying element and the first reflecting element are sequentially arranged along a transmission direction of the parallel rays;
after the parallel rays pass through the polarizing beam-splitting element, the first polarized ray is reflected by the polarizing beam-splitting element to a light-entering surface of the light guide plate; the second polarized ray passes through the polarizing beam-splitting element and continues to travel to the phase delaying element;
the second polarized ray is converted into the third polarized ray via the phase delaying element; and
the third polarized ray is reflected by the first reflecting element to the light-entering surface of the light guide plate.

3. The backlight module according to claim 1, further comprising:
a first light blocking element, which is coupled to the polarizing beam-splitting element and arranged along a direction parallel to the transmission direction of the parallel rays; the first light blocking element being configured to prevent rays from being directly transmitted to the phase delaying element without passing through the polarizing beam-splitting element, or prevent the rays from being transmitted outside the light guide tube.

4. The backlight module according to claim 3, wherein the first light blocking element is a second reflecting element having a light reflecting function.

5. The backlight module according to claim 3, wherein the polarizing beam-splitting element is obliquely backward arranged in the transmission direction of the parallel rays.

6. The backlight module according to claim 3, wherein the backlight module is provided with at least two polarizing beam-splitting elements and at least two first light blocking elements, which are spaced apart from each other and arranged in a stair-like manner within the light guide tube from a position away from a light-exiting surface of the light guide tube to a position close to the light-exiting surface of the light guide tube; and a projection of the polarizing beam-splitting elements and the first light blocking elements on a transverse section of the hollow tube body covers the entire transverse section.

7. The backlight module according to claim 1, further comprising:
a second light blocking element arranged behind the phase delaying element within the hollow tube body along a direction parallel to the transmission direction of the parallel rays and coupled to the first reflecting element; the second light blocking element being configured to block the rays from being transmitted outside the hollow tube body.

8. The backlight module according to claim 7, wherein the backlight module is provided with at least two second light blocking elements and at least two first reflecting elements, which are spaced apart from each other and arranged in a stair-like manner within the light guide tube from a position away from the light-exiting surface of the light guide tube to a position close to the light-exiting surface of the light guide tube; a projection of the second light blocking elements and the first light blocking elements on the transverse section of the hollow tube body covers the entire transverse section.

9. The backlight module according to claim 1, wherein the light guide plate comprises:
a light-exiting surface of the light guide plate; and a first surface arranged parallel and opposite to the light-exiting surface of the light guide plate;
the light guide plate further comprises:
a reverse prism layer arranged on the light-exiting surface of the light guide plate and configured to transmit the incident polarized rays, after passing through the light guide plate, in a direction perpendicular to the light-exiting surface of the light guide plate; and
a reflective prism layer arranged on the first surface of the light guide plate and configured to reflect the incident polarized ray transmitted within the light guide plate and reaching the first surface toward the light-exiting surface of the light guide plate.

10. The backlight module according to claim 9, wherein the light guide plate further comprises:
a third reflecting element arranged on an outer surface of the first surface and configured to reflect the incident polarized ray passing through the first surface to an interior of the light guide plate.

11. The backlight module according to claim 1, further comprising:
a beam expanding element arranged at a light-entering side of the light guide plate and configured to increase an incident angle of the incident polarized ray entering the light guide plate.

12. The backlight module according to claim 1, wherein the polarizing beam-splitting element comprises a dual brightness enhancement film.

13. The backlight module according to claim 1, wherein the phase delaying element comprises a half-wave plate or two quarter-wave plates.

14. A display device, comprising a display panel and a backlight module according to claim 1.

* * * * *